US006811253B1

(12) United States Patent
King et al.

(10) Patent No.: US 6,811,253 B1
(45) Date of Patent: Nov. 2, 2004

(54) INK JET PRINTING METHOD

(75) Inventors: Jeffrey Ronald King, Holmes Chapel (GB); Karen Taylor, Poynton (GB); Simon Richard John Leggett, Marsens (CH); Stefan Schüttel, Murten (CH); Meinrad Schaer, Ependes (CH)

(73) Assignees: ILFORD Imaging UK Limited (GB); ILFORD Imaging Switzerland GmbH (CH)

( * ) Notice: Subject to any disclaimer, the term of this patent is extended or adjusted under 35 U.S.C. 154(b) by 36 days.

(21) Appl. No.: 09/631,412

(22) Filed: Aug. 3, 2000

(30) Foreign Application Priority Data

Aug. 4, 1999 (GB) ............................................ 9918265

(51) Int. Cl.[7] ............................. B41J 2/01; B05D 3/02; C08L 29/04; C08L 23/04

(52) U.S. Cl. .................... 347/105; 427/372.2; 524/503; 524/528

(58) Field of Search ................................ 347/100, 105, 347/106; 523/160, 161; 428/516, 517, 519, 521, 195.1; 427/372.2, 375; 524/503, 528

(56) References Cited

U.S. PATENT DOCUMENTS

| | | | | | |
|---|---|---|---|---|---|
| 3,889,270 | A | | 6/1975 | Hoffmann et al. | |
| 4,196,253 | A | | 4/1980 | Spence | |
| 4,308,542 | A | | 12/1981 | Maekawa et al. | |
| 4,642,247 | A | | 2/1987 | Mouri et al. | |
| 4,741,969 | A | | 5/1988 | Hayama et al. | |
| 4,785,313 | A | | 11/1988 | Higuma et al. | |
| 4,832,984 | A | | 5/1989 | Hasegawa et al. | |
| 4,879,148 | A | | 11/1989 | Neaves et al. | |
| 4,954,395 | A | | 9/1990 | Hasegawa et al. | |
| 4,980,229 | A | | 12/1990 | Park et al. | |
| 5,027,131 | A | | 6/1991 | Hasegawa et al. | |
| 5,140,339 | A | * | 8/1992 | Higuma et al. | 347/43 |
| 5,194,317 | A | | 3/1993 | Sato et al. | |
| 5,242,739 | A | | 9/1993 | Kronzer et al. | |
| 5,270,103 | A | | 12/1993 | Oliver et al. | |
| 5,374,475 | A | | 12/1994 | Walchli | |
| 5,405,678 | A | | 4/1995 | Bilodeau | |
| 5,501,902 | A | | 3/1996 | Kronzer | |
| 5,576,088 | A | | 11/1996 | Ogawa et al. | |
| 5,601,928 | A | | 2/1997 | Katayama et al. | |
| 5,605,750 | A | * | 2/1997 | Romano et al. | 428/304.4 |
| 5,660,928 | A | | 8/1997 | Stokes et al. | |
| 5,750,200 | A | | 5/1998 | Ogawa et al. | |
| 5,764,262 | A | | 6/1998 | Wu et al. | |
| 5,798,179 | A | | 8/1998 | Kronzer | |
| 5,837,375 | A | | 11/1998 | Brault et al. | |
| 5,853,540 | A | | 12/1998 | Niemoller et al. | |
| 5,856,000 | A | * | 1/1999 | Mizukami et al. | 428/327 |
| 5,925,712 | A | | 7/1999 | Kronzer | |
| 5,962,149 | A | | 10/1999 | Kronzer | |
| 5,984,467 | A | * | 11/1999 | Bodager et al. | 347/101 |
| 5,989,701 | A | | 11/1999 | Goetzen et al. | |
| 6,001,463 | A | * | 12/1999 | Shibahara et al. | 428/216 |
| 6,013,354 | A | | 1/2000 | Tomizawa et al. | |
| 6,015,624 | A | | 1/2000 | Williams | |
| 6,017,611 | A | | 1/2000 | Cheng et al. | |
| 6,033,739 | A | | 3/2000 | Kronzer | |
| 6,051,305 | A | | 4/2000 | Hsu | |
| 6,147,139 | A | * | 11/2000 | Shaw-Klein et al. | 523/160 |
| 6,203,899 | B1 | * | 3/2001 | Hirose et al. | 428/341 |
| 6,242,082 | B1 | * | 6/2001 | Mukoyoshi et al. | 428/212 |
| 6,357,871 | B1 | * | 3/2002 | Ashida et al. | 347/106 |
| 6,457,824 | B1 | * | 10/2002 | Wexler | 347/105 |
| 6,550,909 | B2 | * | 4/2003 | Ichinose et al. | 347/105 |

FOREIGN PATENT DOCUMENTS

| | | | |
|---|---|---|---|
| EP | 0049 040 | A1 | 4/1982 |
| EP | 0237 258 | B1 | 9/1987 |
| EP | 0858 905 | A1 | 8/1998 |
| EP | 0858 906 | A1 | 8/1998 |
| EP | 0908324 | A1 | 4/1999 |
| EP | 0912 348 | B1 | 5/1999 |
| EP | 0 925 945 | A3 | 3/2000 |
| EP | 0983 866 | A2 | 3/2000 |
| EP | 1016 544 | A2 | 7/2000 |
| GB | 2337 482 | A | 11/1999 |
| JP | 58136482 | A | 8/1983 |
| JP | 59204591 | A | 11/1984 |
| JP | 59204592 | A | 11/1984 |
| JP | 59222381 | A | 12/1984 |
| JP | 62183380 | A | 8/1987 |
| JP | 62264986 | A | 11/1987 |
| JP | 62264988 | A | 11/1987 |
| JP | 62280067 | A | 12/1987 |
| JP | 62280068 | A | 12/1987 |
| JP | 01085767 | A | 3/1989 |
| JP | 01085768 | A | 3/1989 |
| JP | 04021146 | A | 1/1992 |
| JP | 07237348 | A | 9/1995 |
| JP | 08002090 | A | 1/1996 |
| JP | 08207426 | A | 8/1996 |
| JP | 08282090 | A | 10/1996 |
| JP | 09104163 | A | 4/1997 |
| JP | 9104164 | A | 4/1997 |
| JP | 09104164 | A | 4/1997 |
| WO | WO 98/02314 | | 1/1998 |
| WO | WO 00/63024 | | 10/2000 |
| WO | WO 00/68501 | | 11/2000 |
| WO | WO00/72984 | A1 | 12/2000 |

* cited by examiner

*Primary Examiner*—Callie Shosho
(74) *Attorney, Agent, or Firm*—Dara L. Onofrio, Esq.; Onofrio Law

(57) ABSTRACT

A recording medium comprising a substrate coated with at least one ink receiving layer and at least one protective layer which comprises polymeric particles having film forming temperatures between 60 to 140° C., preferably between 100 to 120° C., and at least one binder. In the related printing method, the printed medium is heated to form a stable image protecting coating.

14 Claims, 1 Drawing Sheet

INK JET PRINTING METHOD

FIELD OF INVENTION

This invention relates to a recording medium for ink jet recording and to the treatment of images prepared by an ink-jet printing process.

BACKGROUND OF THE INVENTION

Ink jet printing is a non impact printing method that in response to a digital signal produces droplets of ink that are deposited on a substrate to produce an image. Ink jet printing has found broad application in industry as well as for output from personal computers in the home and office. There is increasing interest in the use of digital imaging with an ink jet printers as an alternative to conventional photographic imaging techniques. However the images produced by ink jet printers are seen as suffering several disadvantages when compared with conventional photographic images. In general they lack the overall quality of photographic images, look and feel substantially different, lack stability to light, and are more sensitive to water, scratching, rubbing, and environmental influences.

Aqueous inks are commonly used in ink jet printers for environmental and safety reasons, particularly those intended for use in the home or office. However sensitivity of the printed image to water is a particular problem where aqueous inks are used.

One way of overcoming these disadvantages is to laminate or encapsulate ink jet images, particularly those destined for external display. By lamination is meant the combination of a printed ink jet receiving layer with a transparent overlay, this combination usually being accomplished with an adhesive activated by heat, pressure, or both. The overlay acts as a physical protection for the image and completely seals it from ingress of water. By encapsulation is meant the combination of a printed ink jet receiving layer between two laminating sheets, that on the image surface being transparent, the combination being accomplished with an adhesive activated by heat, pressure, or both. Encapsulation is most effective if the laminating sheets extend beyond the ink jet image and are bonded to each other at the extremities, thus preventing ingress of water through exposed edges of the ink jet image.

However lamination and encapsulation both have disadvantages. They are expensive because additional materials are required together with additional handling and equipment. Moreover residual solvents such as the organic cosolvents which are frequently incorporated with aqueous inks remain trapped with the printed image, and these can sometimes degrade image quality by causing stain or migration of the image on storage or exposure. In addition the material of the laminate or adhesive can also deteriorate and cause stain on exposure. Laminates do not always adhere well to printed ink jet images, and adhesion can depend on the coatings of the ink receiving layer, the amount and type of solvent in the ink, and also on the quantity of ink laid down. This is particularly found when the ink jet image is being used instead of a conventional photographic image, as heavy ink loads are often used to reproduce the, image quality.

As an alternative to lamination, various additional coatings and treatments for ink jet receiving layers have been proposed. In most cases these are coatings such as lacquers or varnishes which have to be applied after printing the image, thus also requiring additional equipment. For instance British Patent 2 337 482 A provides a method for increasing the rub resistance of an ink jet image by coating or over-printing the image with an aqueous solution of a styrene acrylate polymer.

Various types of ink jet receiving materials are also known wherein the top layer or an upper layer of the material comprises a film forming polymer and the lower layer or layers comprise ink receiving layers, such that when the image is printed the ink passes through the upper layer or layers and is held by the lower layers. The material is subsequently heated above the film forming temperature of the polymer, which thus fuses to form a barrier layer which seals the image. Such heat sealing systems are disclosed for instance in Japanese Patent Applications 59/222381, 07/237348, 08/02090, and 09/104164 and in European Patent Applications 0 858 905 and 0 858 906. This method is limited, however, as a high temperature is necessary to melt the polymer (170° C. in the Examples of EP 0 858 906), and special equipment is required to achieve this. Moreover not all substrates and ink receiving layers can withstand the high fusing temperature, and this restricts the generality of these methods. In addition the resultant image retains the solvents and can be subject to deterioration in the same fashion as a laminated or encapsulated image.

There is thus still a need for a convenient and general method for protecting ink jet images. We have found such a method.

SUMMARY OF THE INVENTION

According to the present invention there is provided an ink jet printing method which comprises the steps of:

1) printing on to a receiving medium which comprises a substrate coated with at least one ink receiving layer and at least one upper protective layer which comprises polymeric particles having film forming temperatures between 60 to 140° C., preferably between 100 to 120° C., and at least one binder, and
2) subsequently heating the printed image to form a stable image protecting coating.

In contrast to the materials previously known in the art, the image in the materials of this invention is substantially retained within the upper protective layer. It is believed, however, that any retained solvents are held in the lower image receiving layers, thus separating them from the colorant.

The protective layers of the invention are receptive to inks during printing, give high quality images of good colour strength, adhere well after printing and fusing, provide a high level of scratch and rub resistance to the final image even when wet, and maintain the same level of flexibility as the rest of the assembly.

DETAILED DESCRIPTION OF THE INVENTION

Figure 1:
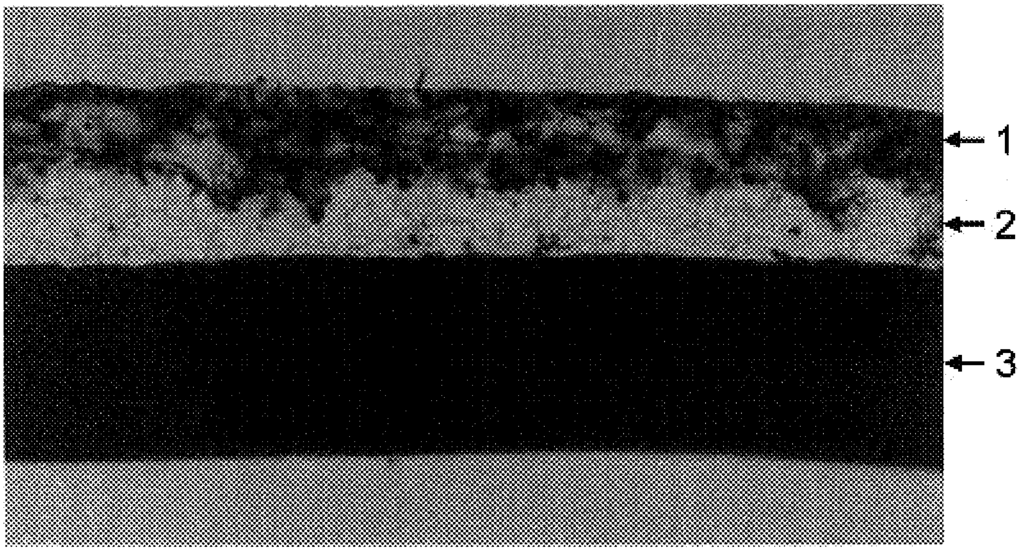
FIG. 1 is a cross section of the recording medium of Example 3 an after printing, wherein 1 is the upper protective layer, 2 is the receiving layer, and 3 is the poly(vinyl chloride) base.

Suitable substrates to carry the layers of the invention include any of those commonly used for ink jet receiving media, for example paper, high wet-strength paper, label grade paper, treated paper such as pigment, resin or polyethylene coated paper, transparency materials, synthetic papers, fabrics, transfer materials, and polymeric substrates such as cellulose acetates, polyesters, poly(propylene), and poly (vinyl chloride).

Suitable ink receiving layers include any of those commonly used in ink jet media, particularly those employing at least one binder such as gelatin, poly (vinyl alcohol), poly (vinyl pyrrolidone), carbohydrates such as gums, treated carbohydrates such as hydroxyethyl cellulose or carboxymethyl cellulose, acrylic polymers, or mixtures of such binders. Such ink receiving layers are well known in the art. Preferably the ink receiving layer comprises poly (vinyl alcohol) having a degree of hydrolysis of at least 88% as binder. It is to be understood that the ink receiving layers for the materials of this invention may advantageously include additives which are commonly employed in ink jet receiving layers such as inorganic pigments or fillers such as silica, alumina, clays, and calcium carbonate, dye fixing agents such as cationic polymers, surfactants, cross linking agents, optical brighteners, and light stabilisers.

Suitable binders for the upper protective layer include poly (vinyl alcohol), copolymers of poly (vinyl alcohol), gelatin, poly (vinyl pyrrolidone), carbohydrates such as gums, treated carbohydrates such as hydroxyethyl cellulose or carboxymethyl cellulose, acrylic polymers, or mixtures of such binders. A preferred binder is poly (vinyl alcohol) which has a degree of hydrolysis of at least 90%, and a particularly preferred binder is poly (vinyl alcohol) which is about 99% hydrolysed. This is hereinafter referred to as 99% PVA.

A suitable particle size for the polymeric particles is between about 1μm and about 50μm, with a particle size between about 5μm and about 20μm being preferable. Suitable polymers for the polymeric particles include low density polyethylene and copolymers of ethylene with other ethylenically unsaturated monomers, such as ethylene-acrylic acid copolymers. A particularly suitable particulate polymer comprises low density polyethylene spherical beads having an average diameter of about 12μm. Another particularly suitable particulate polymer comprises spherical beads of a 7% acrylic acid/polyethylene copolymer having an average diameter of about 10μm. These polymers have film forming temperatures of 105–107° C. As described on page 489 in the book Emulsion Polymerisation and Emulsion Polymers (edited by P. A. Lovell and M. S. El-Asser published by John Wiley and sons in 1997) the film forming temperature represents the minimum temperature at which a latex dispersion will form a film.

A suitable coating weight for the upper protective layer is from about 15 to about 40 $gm^{-2}$. A preferred coating weight is between about 25 and about 30 $gm^{-2}$.

The upper protective layer may optionally also comprise additives such as surfactants to improve coating quality and cross linking agents such as aldehydes, boric acid, divalent metallic cations and the like.

The image receiving materials of the invention may be prepared by simultaneously coating the image receiving layer or layers together with the upper protective layer on to the substrate. Alternatively the upper protective layer may be coated on to a existing ink jet medium which comprises the substrate and image receiving layers. The upper protective layers of the invention are particularly suitable for this second aspect as they may be coated as aqueous formulations which give good adhesion to the image receiving layer.

According to one aspect of this invention, the printed image is heated bypassing through a laminator. By laminator is meant a device which is normally used for the lamination of printed images which comprises a means of heating and pressing together the image and the laminating sheet thus causing the two to adhere, commonly by passing them through heated rollers. This aspect is particularly preferable because many printing and processing houses already possess and use laminators which can be applied to the materials of this invention. However the advantage of this invention is that the additional expensive lamination sheet is unnecessary. Alternatively the heating process may use any other convenient method, such as heated air or infra red or microwave radiation.

According to another aspect of the invention, the printed image is heated by passing through a laminator in conjunction with a second, inert sheet which is held against the image protective layer of the material. The inert sheet does not adhere to the material, but protects it from the rollers of the laminator, and may be used to impart a high gloss or other desired appearance such as an embossed pattern or security symbol to the final image by suitable choice of the inert sheet. The inert sheet may then be recycled. Suitable inert sheets include release papers or liners such as silicone release liners, casting films and papers, and polyester films.

The materials of the invention may be printed using any convenient ink jet printer, for example a continuous printer or a piezoelectric or thermal drop-on-demand printer. Suitable jetting inks include aqueous inks and those based on organic solvents such as 2-butanone (MEK), ester solvents, and mineral oils. Suitable colorants for these inks include dyes or pigments. Preferred inks for the invention are pigmented aqueous inks.

The following Examples will serve to illustrate the invention but are not meant to be limiting in any sense:

EXAMPLE 1

A formulation was prepared using the following components:

| | |
|---|---|
| 99% PVA 10% solution | 10.0 g |
| Silicone surfactant | 0.25 g |
| Ethylene acrylic acid copolymer beads | 5.0 g |
| Deionised water | 4.75 g |

This formulation was coated on to a commercially available ink jet receiving medium which has a poly (vinyl chloride) substrate coated with a receiving layer comprising poly(vinyl alcohol)/poly(vinyl acetate), silica, and a carbohydrate gum. The coating weight of the upper protective layer is 29 $gm^{-2}$. A test pattern was printed with pigmented inks using an Epson 200 printer, allowed to dry, and the coating was sealed by passing it through a GBC 1200 laminator at a heat setting corresponding to a temperature of 120° C. with the image face contacted with a smooth inert cover sheet. A clear glossy image was produced, resistant to wet rubbing, and the cover sheet was recovered or reuse.

EXAMPLE 2

A receiving layer was prepared as in Example 1. This was printed on a Novajet III printer and sealed using a Seal Image 600 laminator. A bright image was produced, resistant to smudging when rubbed with a thumb despite a high ink loading.

EXAMPLE 3

A receiving layer was prepared as in Example 2. It was printed with a test chart and the image was sealed as in Example 2. A black area of the image showing 100% density of yellow, magenta, and cyan inks was selected, and a cross section prepared using a microtone. This cross section was viewed on a microscope and is shown in FIG. 1. This figure clearly shows the top sealed layer 1, the lower receiving layer 2, and the poly(vinyl chloride) base 3. Substantially all of the black image is located in the top sealed layer 1.

EXAMPLE 4

A coating solution was prepared as follows: 12.5 g of polyethylene beads were mixed with 12.5 g of a 5% solution of Olin 10G surfactant and warmed to 40° C. 6.25 g of a 10% solution of a high isoelectric point gelatin was added, and the mixture made up to 50 ml with water and dispersed with ultrasound for 5 minutes. This solution was coated and printed as in Example 2.

EXAMPLE 5

A formulation was prepared using the following components:

| | |
|---|---|
| 98% PVA 7.5% solution | 40.0 g |
| Triton X100 surfactant 3% solution | 20.0 g |
| Polyethylene beads | 20.0 g |
| Deionised water | 20.0 g |

Triton X100 is a non-ionic wetting agent based on octylphenol ethoxylate (ave. 9 to 10 moles ethylene oxide). The supplier is Union Carbide Chemicals and Plastics Company Inc., Danbury, Conn., USA. This formulation was coated on to a commercially available ink jet receiving medium, Ilford UM2GP6, which has a substrate comprising a paper core coated on each side with a later of polyethylene, the face side of which is coated with a receiving layer comprising a mixture of swelling polymers The coating weight of the upper protective layer is 36 $gm^{-2}$. A test pattern was printed with aqueous dye-based inks using an Epson 800 printer, allowed to dry, and the coating was sealed by passing it through a Seal Image 400 laminator at a heat setting corresponding to a temperature of 118° C. with the image face contacted with a smooth sheet of polyester film. A clear glossy image was produced which was resistant to wet rubbing.

Finally, it is understood that variations and modifications from the examples given herein are possible in view of the foregoing disclosure. Therefore, although the invention has been described with reference to certain preferred embodiments it will be appreciated that other ink receiving layer and protective layer materials may be used, which are nevertheless within the scope and spirit of the invention as defined in the claims appended hereto.

What is claimed is:

1. An ink jet printing method comprising the steps of:

1) printing on to a receiving medium which comprises a substrate coated with at least one ink receiving layer and at least one upper protective layer which comprises polymeric particles having film forming temperatures between 60 to 140° C. and a binder; and 2) heating the printed image to form a stable image-protecting coating; wherein said printed image is substantially retained within the upper protective layer.

2. A method according to claim 1, wherein said ink receiving layer and said protective layer are coated on said substrate simultaneously.

3. A method according to claim 1, wherein said protective layer is coated as an aqueous formulation on top of said ink receiving layer.

4. A method according to claim 1, wherein the printed image is heated under pressure to form the protective coating.

5. A method according to claim 1, wherein the printed image is heated by passing through a laminator.

6. A method according to claim 5, wherein an inert sheet is in contact with said protective layer and passed through said laminator.

7. A method according to claim 6, wherein said inert sheet includes release papers or liners, silicone release liners, casting films and papers, or polyester films.

8. A method according to claim 6, wherein said inert sheet is used to impart a high gloss, embossed pattern or security symbol to the final image.

9. A method according to claim 1, wherein said binder is polyvinyl alcohol.

10. A method according to claim 1, wherein said polymeric particles comprise low density polyethylene.

11. A method according to claim 10, wherein said polymeric particles comprise low density polyethylene spherical beads having an average diameter of approximately 12$\mu$m.

12. A method according to claim 1, wherein said polymeric particles comprise spherical beads of a 7% acrylic acid/polyethylene copolymer having an average diameter of approximately 10$\mu$m.

13. A method according to claim 1, wherein inks used to print the image on said receiving layer are selected from the group consisting of aqueous inks and inks based on organic solvents.

14. A method according to claim 1, wherein said binder is a hydrophilic binder.

* * * * *